(12) United States Patent
Govaerts et al.

(10) Patent No.: US 11,992,903 B2
(45) Date of Patent: May 28, 2024

(54) SOLDER AND METHOD FOR PRODUCING HIGH PURITY LEAD

(71) Applicant: METALLO BELGIUM, Beerse (BE)

(72) Inventors: Koen Govaerts, Beerse (BE); Pelle Lemmens, Beerse (BE); Kris Mannaerts, Beerse (BE); Jan Dirk A. Goris, Beerse (BE); Yves De Visscher, Beerse (BE); Charles Geenen, Beerse (BE); Bert Coletti, Beerse (BE)

(73) Assignee: METALLO BELGIUM, Beerse (BE)

( * ) Notice: Subject to any disclaimer, the term of this patent is extended or adjusted under 35 U.S.C. 154(b) by 73 days.

(21) Appl. No.: 17/697,649

(22) Filed: Mar. 17, 2022

(65) Prior Publication Data

US 2022/0203482 A1 Jun. 30, 2022

Related U.S. Application Data

(62) Division of application No. 16/335,892, filed as application No. PCT/EP2017/074393 on Sep. 26, 2017.

(30) Foreign Application Priority Data

Sep. 27, 2016 (EP) .................................. 16190907

(51) Int. Cl.
*B23K 35/26* (2006.01)
*B01D 3/10* (2006.01)
*C22C 11/10* (2006.01)

(52) U.S. Cl.
CPC .............. *B23K 35/268* (2013.01); *B01D 3/10* (2013.01); *C22C 11/10* (2013.01)

(58) Field of Classification Search
CPC ......... C22B 13/00; C22B 13/02; C22B 13/04; C22B 13/06; C22B 9/00; C22B 9/02;
(Continued)

(56) References Cited

U.S. PATENT DOCUMENTS 3,188,199 A * 6/1965 Wolfe ..................... C22B 13/06
75/432
3,449,116 A * 6/1969 Derham .................. C22B 19/04
75/10.29
(Continued)

FOREIGN PATENT DOCUMENTS

| CN | 87100127 A | 7/1988 |
| CN | 1899738 A | 1/2007 |

(Continued)

OTHER PUBLICATIONS

CN-101696475-A: Espacenet English machine translation (Year: 2010).*

(Continued)

*Primary Examiner* — Adil A. Siddiqui
(74) *Attorney, Agent, or Firm* — Christensen O'Connor Johnson Kindness PLLC (57) ABSTRACT

A process for the production of a metal mixture composition containing lead and tin, and comprising by weight at least 10% tin and 45% lead, at least 90% of tin and lead together, more lead than tin, from 1-5000 ppm of copper, at least 0.42% antimony and at least 0.0001% wt of sulphur, at most 0.1% of the total of chromium, manganese, vanadium, titanium and tungsten, and at most 0.1% of each one of aluminium, nickel, iron and zinc. The process includes a pre-treatment step for producing the metal mixture composition, followed by a vacuum distillation step wherein lead is removed by evaporation and a bottom stream is obtained comprising at least 0.6% wt of lead.

18 Claims, 1 Drawing Sheet

(58) Field of Classification Search
CPC .......... C22B 9/04; B23K 35/268; B01D 3/10; C22C 11/10; C22C 11/06
USPC ..................................... 203/11; 75/697, 698
See application file for complete search history.

(56) References Cited

U.S. PATENT DOCUMENTS

| | | | | |
|---|---|---|---|---|
| 4,153,451 | A | * | 5/1979 | Crasto .................... C22B 13/02 75/432 |
| 4,487,638 | A | | 12/1984 | Hoge |
| 2004/0050903 | A1 | | 3/2004 | Satou |

FOREIGN PATENT DOCUMENTS

| | | | | |
|---|---|---|---|---|
| CN | 101570826 | A | | 11/2009 |
| CN | 101696475 | A | * | 4/2010 |
| CN | 101696475 | A | | 4/2010 |
| CN | 102352443 | A | | 2/2012 |
| CN | 102534249 | A | | 7/2012 |
| CN | 104141152 | A | | 11/2014 |
| CN | 104593614 | A | | 5/2015 |
| CN | 104651626 | A | | 5/2015 |
| JP | H07-299584 | A | | 11/1995 |
| RU | 2114200 | C1 | | 6/1998 |
| RU | 2496894 | C1 | | 10/2013 |
| SU | 299559 | A1 | | 3/1971 |

OTHER PUBLICATIONS

International Search Report dated Nov. 30, 2017, issued in corresponding International Application No. PCT/EP2017/074393, filed Sep. 26, 2017, 5 pages.

Written Opinion of the International Searching Authority dated Nov. 30, 2017, issued in corresponding International Application No. PCT/EP2017/074393, filed Sep. 26, 2017, 6 pages.

International Preliminary Report on Patentability (Chapter II) dated Nov. 21, 2018, issued in corresponding International Application No. PCT/EP2017/074393, filed Sep. 26, 2017, 5 pages.

Spiekermann, P., "Legierungen—Ein Besonderes Patentrechtliches Problem?—Legierungspruefung Im Europaeischen Patentamt," Mitteilungen Der Deutschen Patentanwaelte pp. 178-190, Jan. 1, 1993.

Kittler, M., "Manufacture of cast imitation jewelry," Sklar A Keramik 26(4):107-111, Jan. 1, 1976.

Kong, X., et al., "Removal of impurities from crude lead with high impurities by vacuum distillation and its analysis," Vacuum 105:17-20, Jan. 1, 2014.

Davey, T.R.A., "Distillation under moderately high vacuum, illustrated by the vacuum distillation of zinc from lead—Theoretical," Vacuum 12(2):83-95, Mar. 1, 1962.

Yang, B., et al., "Recycling of metals from waste Sn-based alloys by vacuum separation," Transactions of Nonferrous Metals Society of China 25(4):1315-1324, May 6, 2015.

* cited by examiner

SOLDER AND METHOD FOR PRODUCING HIGH PURITY LEAD

CROSS-REFERENCES TO RELATED APPLICATIONS

This application is a divisional of U.S. application Ser. No. 16/335,892, filed Mar. 22, 2019, which is a National Stage of international application number PCT/EP2017/074393, filed Sep. 26, 2017, which claims foreign priority to European application number 16190907.2, filed Sep. 27, 2016, the contents of which are incorporated herein by reference in their entirety.

FIELD OF THE DISCLOSURE

Embodiments of the present disclosure relate to the production of non-ferrous metals, in particular tin (Sn) and lead (Pb) in combination with the production of copper (Cu), from primary sources, meaning fresh ore, from secondary feedstocks, also known as recyclable materials, or from combinations thereof, by pyrometallurgy. Recyclable materials may for instance be by-products, waste materials and end-of-life materials. More particularly, the disclosure relates to an improved solder composition, a metal mixture comprising primarily tin and lead which is generated as a coproduct from copper metal production, and to the preparation and the separation thereof by vacuum distillation.

BACKGROUND

The materials available as feedstock for the production of non-ferrous metals typically contain a plurality of metals. Because of the high purity requirements for the non-ferrous metals in most of their high volume applications, the different metals need to be separated from each other in the production process. The non-ferrous metal production processes typically contain at least one and usually a plurality of pyrometallurgical process steps in which metals and metal oxides both occur in a liquid molten state, and wherein the metal oxides may be separated by gravity as a separate and typically lighter liquid slag phase from the molten metal phase. The slag phase is usually withdrawn as a separate stream from the process, and this separation may lead to the production of a slag as the coproduct from the metal production.

The non-ferrous metals may be produced from fresh ore as the starting material, also called primary sources, or from recycled materials, also known as secondary feedstocks, or from a combination thereof.

The recovery of non-ferrous metals from secondary feedstocks has become an activity of paramount importance over the years. The recycling of non-ferrous metals after use has become a key contributor in the industry, because of the continuing strong demand for such metals and the reducing availability of high quality fresh metal ores. Also the processing of secondary feedstocks typically involves the use of pyrometallurgical process steps, such as smelters, which generate a slag as coproduct.

When producing copper by pyrometallurgy, any tin and/or lead present has the tendency to become more readily oxidized and the oxides thereof then readily move into the supernatant slag phase. This slag may be separated from the copper-rich molten metal. By a subsequent chemical reduction step, the tin and/or lead in the slag may then be returned into their metal state, and these metals may be separated from the remaining slag as a molten metal mixture which is rich in tin and/or lead, typically containing significant amount of both. These metal streams typically have a lower melting point than the copper-containing coproducts. They are often called "solder" and sometimes also "white metal". Besides the tin and lead, these crude solder compositions may contain significant but minor amounts of other metals, such as copper (Cu), antimony (Sb), arsenic (As), bismuth (Bi), iron (Fe), indium (In), nickel (Ni), zinc (Zn), aluminium (Al), germanium (Ge), tellurium (Te), cobalt (Co), manganese (Mn), selenium (Se), silicon (Si), thallium (Tl), gallium (Ga), and sometimes also precious metals, albeit usually in smaller amounts, such as silver (Ag), gold (Au), platinum (Pt), palladium (Pd), ruthenium (Ru), rhodium (Rh), osmium (Os), and iridium (Ir). The crude solder may also contain elements which are not considered metals, such as sulphur (S), carbon (C) and oxygen (O).

The crude solder compositions may have direct commercial uses, depending on their composition, but the need exists to recover individual components from the solder in a higher purity form to make the metal products acceptable for upgrade into their more demanding end-uses. A high interest remains primarily in recovering higher purity tin (Sn) from such solder streams, and also in recovering lead (Pb) in some higher purity forms.

A known technique for obtaining higher purity metal streams starting from solder, is by vacuum distillation, a technique which is typically performed under very low pressures, typically not more than 50 Pa absolute, possibly not more than 10-15 Pa, and often as low as 1-5 Pa, in combination with relatively high temperatures of at least 900° C., often as high as 1100° C. The vacuum distillation of solder-type metal mixtures may be performed batch-wise, and such batch vacuum distillation techniques have been disclosed in CN101696475, CN104141152, CN101570826, and in Yang et al, "Recycling of metals from waste Sn-based alloys by vacuum separation", Transactions of Nonferrous Metals Society of China, 25 (2015), 1315-1324, Elsevier Science Press. The distillation under vacuum of metals may also be performed in continuous mode, and such continuous distillation techniques have been disclosed in CN102352443, CN104651626 and CN104593614.

The inventors have found that the distillation of solder-type metals may be suffering from operational problems, because of the reduction of the fluidity of the molten liquid metal phase during the operation, in particular when Pb starts to evaporate and its concentration reduces. The problem occurs in batch operations, but may become more pronounced in continuous vacuum distillation, whereby over time, even at the high temperatures, insoluble solids may form which may adhere to the distillation equipment, particularly in sensitive areas such as small openings, thereby impairing smooth operations and even blocking the equipment.

The present disclosure aims to obviate or at least mitigate the above described problem and/or to provide improvements generally

SUMMARY

According to the disclosure, there is provided a metal mixture composition and a process in which the metal mixture occurs as an intermediate stream, as defined in any of the accompanying claims.

In an embodiment, the disclosure provides a metal mixture containing lead (Pb) and tin (Sn), the mixture comprising, on a weight basis,
- at least 10% tin (Sn),
- at least 45% lead (Pb),
- at least 90% of tin and lead together,
- more lead than tin,
- at least 1 ppm and at most 5000 ppm of copper (Cu),
- at least 0.42% of antimony (Sb),
- at least 0.0001% wt of sulphur (S), and
- at most 0.1% of the total of chromium (Cr), manganese (Mn), vanadium (V), titanium (Ti) and tungsten (W),
- at most 0.1% of aluminium (Al),
- at most 0.1% of nickel (Ni),
- at most 0.1% of iron (Fe), and
- at most 0.1% of zinc (Zn).

In an embodiment, the disclosure provides a process for the separation by distillation of the metal mixture according to any one of the preceding claims comprising the step of pre-treating a liquid molten metal feed composition,
- a) the feed composition containing substantial portions of tin and lead and comprising at least 0.16% wt of the total of chromium (Cr), manganese (Mn), vanadium (V), titanium (Ti), tungsten (W), copper (Cu), nickel (Ni), iron (Fe), aluminium (Al) and/or zinc (Zn),
- the feed composition being available at a temperature of at least 500° C.,
- the pre-treatment comprising the steps of:
- b) cooling the feed composition down to a temperature of at most 825° C. to produce a bath containing a first supernatant dross which by gravity becomes floating upon a first liquid molten metal phase,
- c) adding an alkali metal and/or an earth alkali metal, or a chemical compound comprising an alkali metal and/or an earth alkali metal, to the first liquid molten metal phase to form a bath containing a second supernatant dross which by gravity comes floating on top of a second liquid molten metal phase, and
- d) removing the second dross from the second liquid molten metal phase,
- whereby the liquid molten metal phase which is obtained as product from the pre-treatment forms the metal mixture according to the present disclosure,
- the process further comprising the step of subjecting the metal mixture to a distillation step wherein lead (Pb) is removed from the metal mixture by evaporation and a bottom product is obtained which comprises at least 0.6% wt of lead.

The inventors have found that particular metals in the feed composition are capable, under the conditions of the vacuum distillation which are suitable to evaporate lead from a mixture comprising tin, of forming mutual intermetallic compounds between at least two of these particular metals and/or intermetallic compounds of at least one of the particular metals with tin. The inventors have further found that many of these intermetallic compounds have a much higher melting point than the temperature of the mixture in which they are formed. The inventors have therefore found that these high melting point intermetallic compounds may come out of solution and form solids. These solids may remain suspended in the liquid metal and risk to reduce the fluidity of the mixture, such as by raising the viscosity of the liquid mixture. This by itself may hinder a smooth operation of the distillation equipment, such as by slowing down the flow of liquid metals reducing the equipment capacity and thus force the equipment to be operated at reduced throughput. The solids may also adhere and/or attach to the distillation equipment, and thereby create a risk for impairing or even obstructing the operation of the distillation equipment, e.g. by clogging up important passages for the process streams. The described phenomenon may even force a shutdown to open and either clean the equipment or replace the affected equipment items.

The inventors have found that the tendency to form such intermetallic compounds increases at a given temperature when the lead content in the liquid metal mixture is reduced. The inventors have found that the risk for the formation of intermetallic compounds therefore increases as the molten feed mixture makes its way from the inlet of the distillation equipment towards the outlet of the bottom product, because of the evaporation of lead from the liquid mixture flowing through the distillation equipment.

The inventors have further found that the tendency to form such intermetallic compounds increases with a reduction of the temperature of the molten liquid metal phase. The inventors have for instance observed that the feed entering the vacuum distillation apparatus may have a lower temperature than the Sn-enriched liquid product that is leaving the distillation equipment. The inventors have thus found that the disadvantageous effects of the intermetallic compounds may be more pronounced at lower temperatures. The applicants believe that therefore the inlet section of the distillation equipment may be particularly prone for the problems described above which are caused by the intermetallic compounds.

The inventors have further found that a continuous distillation of lead from tin is even more prone for the problem which is addressed by the present disclosure. The inventors believe that this is at least partially because a continuous distillation operation provides more time for a gradual build-up of solids which come out of solution and may adhere to the equipment. In a continuous operation, the solids may therefore accumulate and create bigger problems than what may be found in batch operations. In addition, the liquid metal stream in continuous vacuum distillation equipment typically follows a complex pathway having narrow passages. The pathway and these narrow passages are more prone for being obstructed by the intermetallic compounds coming out of solution and seeking attachment to a solid anchoring point.

The inventors have found that in particular chromium (Cr), manganese (Mn), vanadium (V), titanium (Ti), tungsten (W), copper (Cu), nickel (Ni), iron (Fe), zinc (Zn) and aluminium (Al), are metals of which the presence in the solder feed to the vacuum distillation step may lead to the disturbing intermetallic compounds during the vacuum distillation of the solder. Of these potentially disturbing metals, are Cu, Ni, Fe, Zn and Al which are typically more important for being controlled. The reason for this is that it is more advantageous to recover tin and/or lead from feedstocks that contain Cu, Ni, Fe, Zn and Al. Iron and/or aluminium may also be introduced for process reasons into the overall process upstream of the tin and/or lead recovery step. The presence of Cu, Ni, Fe, Zn and Al in the crude solder intermediate product from which one wants to recover the tin and/or lead is therefore more likely and is the result of choices in the upstream process steps and of the selection of the feedstock materials for the upstream process steps, typically of a pyrometallurgical nature.

The inventors have found that the identified problems may significantly be alleviated and even may be avoided by controlling within particular levels the concentration of these metals in the solder feed to the distillation step wherein the solder is separated into more concentrated streams by evaporation of at least part of the lead.

The inventors have further found that these possibly harmful metals, and in particular copper, do not need to be removed entirely from the solder in order to make the solder suitable for vacuum distillation. The inventors have for instance found that the identified problems may be reduced to a practically and economically acceptable level when small amounts of copper remain present in the solder feed to the distillation step. This finding brings the advantage that solder streams may be processed which occur as the by-product from the recovery of copper from primary and/or secondary feedstocks, in particular from secondary feedstocks, even more importantly from feedstocks containing end-of-life materials.

The metal mixture according to the present disclosure comprises at least 0.0001% wt of sulphur (S). We have found that it is not required to bring the levels of sulphur down to very low levels, such as below the detection limit of 1 ppm wt, in order to achieve the result which is targeted with the control of the sulphur content. On the contrary the presence of sulphur in the metal mixture brings a technical benefit.

We have found that sulphur quite readily binds with copper to form a copper sulphide (such as CuS), and that the copper sulphide readily separates by gravity from the liquid metal mixture containing the two main components in the process, i.e. tin and lead. The presence of sulphur is therefore able to contribute in the removal of Cu in every process step which intends to separate Cu in a supernatant dross. The applicants indeed prefer to involve S as a process chemical in the process according to the present disclosure. We have found that the addition of sulphur containing chemical compounds, such as pyrite (FeS) may actually be suitable for this purpose to help reducing the copper content of the metal mixture according to the present disclosure, but we prefer to use elemental sulphur because the use thereof avoids the introduction of one or more extra chemical elements. Hence sulphur in any form, and in particular elemental sulphur, is for the inventors a very suitable process chemical in the removal of some of the undesired metals, in particular of copper.

The presence of sulphur in the metal mixture according to the present disclosure, is therefore a strong indicator that the metal mixture according to the present disclosure has been produced as a byproduct from a copper production process. As a result, the starting material for the process according to the present disclosure may likely contain measurable amounts of copper as an impurity, such as the level that is specified. The copper content of such starting streams may be reduced by a variety of possible process steps, of which the binding of Cu by S is only one. Any S-treatment for the removal of Cu is very likely to leave measurable traces of S in the metal mixture. The presence of S in the metal mixture according to the present disclosure therefore provides a strong relation to the metal mixture having been produced as a by-product from copper production, preferably involving a step comprising the treatment with sulphur or a suitable S-containing compound.

We have further found that the presence of sulphur in the metal mixture according to the present disclosure is of no nuisance provided there is also some copper present, as is specified. The S presence is able to contribute in subsequent clean-up steps to remove Cu from the less noble metal streams, in their path to reach an industrially acceptable quality. The S in the metal mixture according to the present disclosure is therefore a preferred presence, with advantageous benefits showing up downstream.

CN 1 899 738 A discloses a process of soldering between the inner sleeve and the outer sleeve of a pole material for coating. The brazing solder as specified in the document is prepared on purpose and stated to contain primarily Pb and Sn, some Sb, and furthermore not more than 0.5% wt of impurities. The impurities are further specified as a.o. at most 0.08% wt of Cu and at most 0.02% wt of S. There is no disclosure in CN 1 899 738 A of a solder material comprising at least 1 ppm wt of Cu and at least 0.0001% wt, hence also 1 ppm wt, of sulphur. The brazing solder of CN 1 899 738 A is not intended for recovering high purity Pb and/or Sn therefrom.

We have found that the composition according to the present disclosure may readily be subjected to a distillation step to remove the major portion of the lead in the composition by evaporation. We have found that such a distillation is able to produce a lead-rich overhead stream which may readily be further purified by conventional means to obtain a lead product which corresponds to many of the commercial standards, and at the same time produces a bottom stream which is rich in tin but also comprises the majority of the antimony (Sb) present in the product of the treatment together with a minimum presence of lead (Pb). We have found that the presence of antimony (Sb) may not necessarily be a nuisance for this separation provided the level of antimony remains within reasonable limits and there remains the prescribed level of Pb in the Sn-rich bottom product of the distillation operation. The applicants believe that the Pb which remains in the Sn product of the distillation acts as an extra solvent for the antimony, up to a significant level which may be tolerated as discussed further below in this document. The applicants further believe, by not evaporating all of the Pb that is coming in with the solder feed, that most of the antimony which is coming in with the solder feed to the vacuum distillation also remains in the bottom product, which allows to produce a Pb distillate which remains low in antimony content and hence may therefore more readily be purified to obtain a high purity lead product, also called "soft lead", having the properties desirable for particularly composition-sensitive lead applications.

We have further found that the problem of the formation of intermetallic compounds during the vacuum distillation of the metal mixture according to the present disclosure is further alleviated by leaving at least the prescribed concentration of lead in the bottom product of the distillation step. We believe that this amount of lead has a beneficial impact on keeping the potentially harmful metals better in solution and reducing their tendency for forming the potentially disturbing intermetallic compounds.

We have further found that the presence of a minimum amount of lead in the bottom product of the vacuum distillation performed as part of the process in accordance with the present disclosure makes it easier to remove any silver or other precious metals in the bottom product by means of a crystallizer, using a technique such as is described in CN102534249, which describes a 4-step crystallizer operation for purifying a crude tin stream by removing silver.

We have found that the process in accordance to the present disclosure is able to process a feed which is rich in lead, contains significant amounts of tin (Sn), and contains antimony (Sb) as well as copper (Cu) within specified limits, and to produce on the one hand a distillate suitable for further purification into a commercial grade high purity lead product, and on the other hand a liquid molten metal mixture which is suitable for further upgrade into commercially important amounts of several of the metals present, in particular the tin, the antimony and the remaining lead, but possibly including other metal values such as precious metals, particularly silver (Ag).

The applicants point out that the upstream process which produces the crude solder suitable as feed stream for the process according to the present disclosure is typically operated at a high temperature, typically much higher than the specified 500° C., rather in the range of 700-1000° C. The applicants point further out that the last step of the process in accordance with the present disclosure, i.e. the vacuum distillation step, typically should be operated at an even higher temperature. As explained above in the background section, the typical temperatures for removing lead from tin by vacuum distillation are at least 900° C., often as high as 1100° C.

The applicants therefore submit that step a) of the process according to the present disclosure is counter-intuitive. The applicants submit that the one of ordinary skill in the art would prefer to keep the solder at the high temperature at which it was produced, possibly even heating it further, before it is submitted to a vacuum distillation step for separating lead from tin. The applicants have however found that the cooling step a) as part of the process in accordance of the present disclosure is able to move, without the intervention of any further chemicals, a significant part of the components in the solder which are undesired in the feed for the vacuum distillation step, in the context of the present disclosure, to a supernatant dross phase, this dross phase thus becoming available for being separated from the liquid metal phase. The applicants have found that this cooling step is a significant contributor in creating a separate dross phase rich in the undesired components, leaving a liquid metal phase which contains less of these undesired components and which hence being more suitable for a vacuum distillation step encountering less operational problems caused by the possible formation of intermetallic compounds during the distillation step. The applicants have found that the cooling step is particularly capable of reducing the content of copper, nickel, iron and/or zinc in the remaining liquid solder phase.

The applicants submit that step c) as part of the process in accordance with the present disclosure further reduces the concentration of the undesired metals in the liquid metal phase on its way to the vacuum distillation. This step however consumes chemicals, as specified. The applicants submit that the cooling step a) brings the extra advantage that the subsequent chemical treatment step c) requires less chemicals. The chemical(s) specified for step c) end up acting as a base, and this base ends up in the dross which is removed, at least in step d). The dross contains valuable metals, and it is of economic interest to reuse the dross phases separated from the liquid metal phase as part of the process in accordance with the present disclosure for recovery of the valuable metals. Many of the known recovery processes for these metals from such dross streams are however of a pyrometallurgical nature. They operate at very high temperatures, so high that most of the construction steel of the equipment which comes in contact with the high temperature process streams, is typically protected with refractory material. The chemical(s) used in step c), and ending up in the dross phase separated in step d), are however aggressive towards the most typically used refractory materials that are used in the typical pyrometallurgical non-ferrous metal recovery process steps. The applicants submit that the cooling step a) therefore not only contributes to keeping down the level of the chemical(s) introduced in step c), but also contributes to the level of acceptance for reusing the dross separated in step d) in order to recover metal values therefrom by a pyrometallurgical process.

We have found that in the cooling step b) primarily iron and nickel may chemically bind with tin and that these compounds may come floating on top provided the underlying liquid stream contains sufficient lead, as specified elsewhere in this document, and thus has a sufficiently high density.

We have found that the chemical introduced in step c) is able to bind some of the undesired metals, primarily zinc, and this in a form which also readily comes floating on top under the same provision as explained above for step b).

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein the FIGURE shows a flow diagram of an embodiment of the process according to an embodiment of the present disclosure.

DETAILED DESCRIPTION

Figure 1:
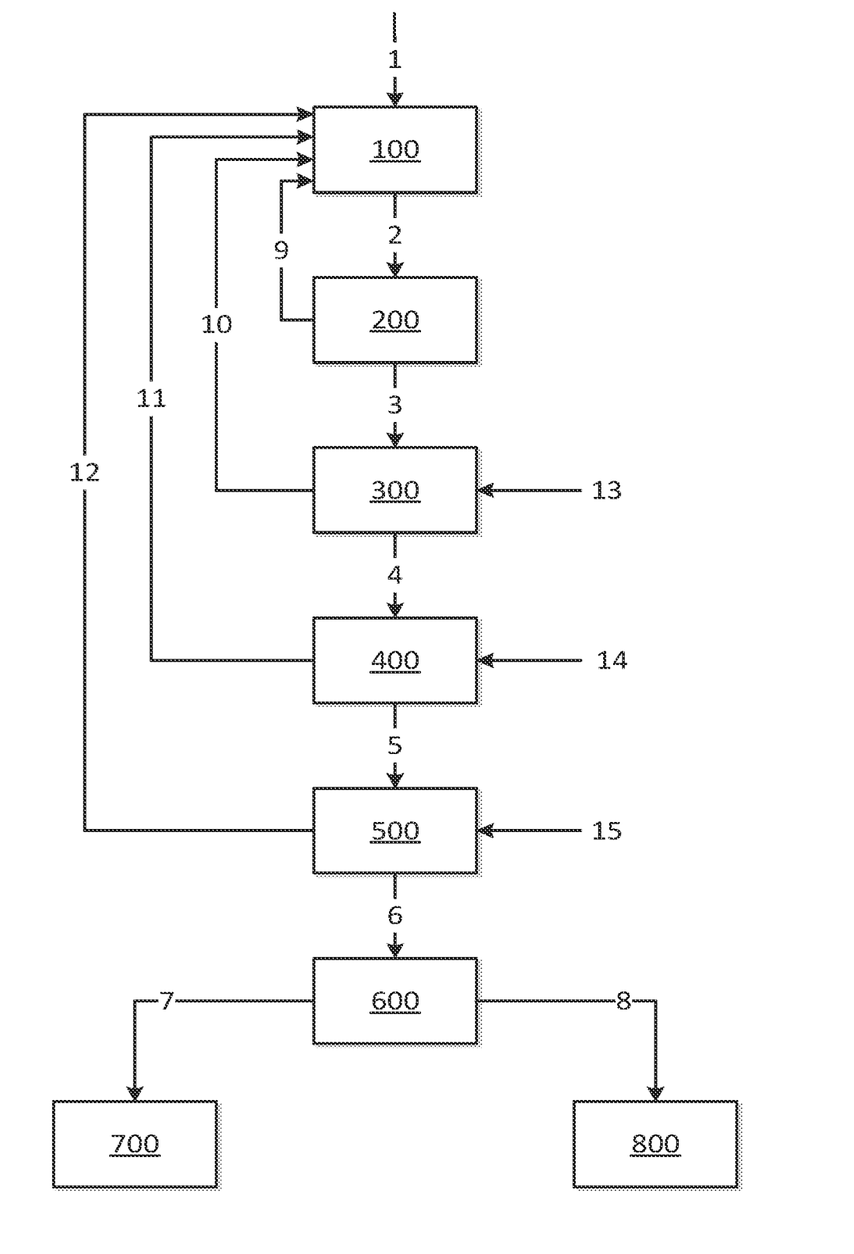

The present disclosure will be described in the following with respect to particular embodiments and with reference to certain drawings but the disclosure is not limited thereto but only by the claims. Any drawings described are only schematic and are non-limiting. In the drawings, the size of some of the elements may be exaggerated and not drawn on scale for illustrative purposes. The dimensions and the relative dimensions do not necessarily correspond to actual reductions to practice of the disclosure.

Furthermore, the terms first, second, third and the like in the description and in the claims, are used for distinguishing between similar elements and not necessarily for describing a sequential or chronological order. The terms are interchangeable under appropriate circumstances and the embodiments of the disclosure can operate in other sequences than described or illustrated herein.

Moreover, the terms top, bottom, over, under and the like in the description and the claims are used for descriptive purposes and not necessarily for describing relative positions. The terms so used are interchangeable under appropriate circumstances and the embodiments of the disclosure described herein can operate in other orientations than described or illustrated herein.

As used herein and in the claims, the terms "comprising" and "including" are inclusive or open-ended and do not exclude additional unrecited elements, compositional components, or method steps. Accordingly, the terms "comprising" and "including" encompass the more restrictive terms "consisting essentially of" and "consisting of."

Unless specified otherwise, all values provided herein include up to and including the endpoints given, and the values of the constituents or components of the compositions are expressed in weight percent or % by weight of each ingredient in the composition.

Additionally, each compound used herein may be discussed interchangeably with respect to its chemical formula, chemical name, abbreviation, etc.

In this document and unless specified differently, amounts of metals and oxides are expressed in accordance with the typical practice in pyrometallurgy. The presence of each metal is typically expressed in its total presence, regardless whether the metal is present in its elemental form (oxidation state=0) or in any chemically bound form, typically in an oxidized form (oxidation state>0). For the metals which may relatively easily be reduced to their elemental forms, and which may occur as molten metal in the pyrometallurgical process, it is fairly common to express their presence in terms of their elemental metal form, even when the composition of a slag or dross is given, wherein the majority of such metals may actually be present in an oxidized and/or chemically bound form. It is therefore that the composition of the metal mixture according to the present disclosure specifies the content of Fe, Zn, Pb, Cu, Sb, Bi as elemental metals. Less noble metals are more difficult to reduce under non-ferrous pyrometallurgical conditions and occur mostly in an oxidized form. These metals typically are expressed in terms of their most common oxide form. Therefore slag or dross compositions are typically giving the content of Si, Ca, Al, Na respectively expressed as $SiO_2$, $CaO$, $Al_2O_3$, $Na_2O$.

In an embodiment, the metal mixture according to the present disclosure comprises at most 0.10% wt of the total of chromium (Cr), manganese (Mn), vanadium (V), titanium (Ti) and tungsten (W) together, preferably at most 0.010%, more preferably at most 0.005%, even more preferably at most 0.0010%, preferably at most 0.0005%, more preferably at most 0.0001% wt of chromium (Cr), manganese (Mn), vanadium (V), titanium (Ti) and tungsten (W) together. We have found that the risk for the formation of potentially disturbing intermetallic compounds is reduced by controlling the presence of these compounds below lower levels.

In an embodiment, the metal mixture according to the present disclosure comprises at least 0.0001% wt of the total of chromium (Cr), manganese (Mn), vanadium (V), titanium (Ti) and tungsten (W) together, preferably at least 0.0005% wt, more preferably at least 0.0010% wt, even more preferably at least 0.0020% wt, preferably at least 0.0030% wt, more preferably at least 0.0050% wt, even more preferably at least 0.010% wt of the total of chromium (Cr), manganese (Mn), vanadium (V), titanium (Ti) and tungsten (W) together. We have found that it is not essential, for obtaining a satisfactory distillation operation, to remove these compounds down to very low levels, such as below their detection limit of about 1 ppm wt. We have on the other hand also found that the removal of these compounds down to the very low levels requires significant extra efforts, process steps, chemicals and attention, and that the extra gain in the distillation operation does not justify the extent of these extras. We have found that it is therefore beneficial to control the presence of these compounds within two measurable limits, as specified above.

In an embodiment, the liquid molten metal feed composition which is pre-treated in the process according to the present disclosure comprises at least 0.5%, more preferably at least 0.75%, even more preferably at least 1.0%, preferably at least 1.5%, more preferably at least 2.0%, even more preferably at least 2.5%, yet more preferably at least 3.0% of the total of chromium (Cr), manganese (Mn), vanadium (V), titanium (Ti), tungsten (W), copper (Cu), nickel (Ni), iron (Fe), aluminium (Al) and/or zinc (Zn) together. We have found that a crude solder containing these compounds at the levels as specified may readily be successfully pre-treated by the process according to the present disclosure such that the downstream vacuum distillation is able to operate unaffected by the formation of intermetallic compounds for an extended period of time. This brings the advantage that the process according to the present disclosure is able to process a crude solder which may be obtained by the pyrometallurgical processing of a wide variety of raw materials and with the use of a wide variety of metal containing auxiliary materials in those upstream process steps. Particularly advantageous is the capability to process a solder which is obtained as the by-product from a copper smelting and refining operations which is fed with secondary raw materials. These secondary raw materials may come from a wide variety of origins, and thus contain a wide variety of other compounds, in particular other metals than lead and/or tin. A further advantage is that also the copper content of the crude solder intended for vacuum distillation does not need to be reduced to very low levels, which reduces the quality pressure on the performances of the upstream process steps, and hence allows these process steps more freedom and thereby a higher efficiency and/or capacity within the same equipment limitations. The applicants have found that the pre-treatment steps of the process in accordance with the present disclosure are readily able to cope with the significant levels of the undesired components as specified. In addition, the specified levels of these components do not necessarily lead to a higher consumption of process chemicals, and to bigger problems in any pyrometallurgical step for the recovery of the metal values from the dross which is removed in step d), because most of the undesired components may already be removable or even be removed by the specified physical means, such as step b).

In an embodiment, the liquid molten metal feed composition which is pre-treated in the process according to the present disclosure comprises at most 10.0%, preferably at most 8.0%, more preferably at most 6.0%, even more preferably at most 5.0%, preferably at most 4.0%, more preferably at most 3.0%, even more preferably at most 2.0%, of the total of chromium (Cr), manganese (Mn), vanadium (V), titanium (Ti), tungsten (W), copper (Cu), nickel (Ni), iron (Fe), aluminium (Al) and/or zinc (Zn) together. We have found that respecting the upper limit as prescribed allows the pre-treatment steps of the process according to the present disclosure to perform more effectively in achieving the desired results, and this in a more efficient way because the requirements in terms of energy and chemicals remains limited, practical and economical. A further advantage of a limited presence of the specified components is that the amount of dross remains limited. Any removed dross inevitably entrains some valuable metals. The dross thus also represents a loss of valuable metals from the main process streams intended for recovering the desired metals, in the present context primarily tin and/or lead but possibly including other metals such as antimony and precious metals. Even if the dross is recycled to a process point upstream of the process in accordance with the present disclosure, the amount of desired metals being recycled with the dross represent a process inefficiency. The reduction of this process loss and/or inefficiency by the limits specified above is therefore an overall process advantage. A further advantage of this feature is also that there will be less lead that is circulating in the overall process in which the metal feed composition is produced and pre-treated. The processing of lead-containing metal streams at high temperatures represents its own issues of industrial hygiene. The specified feature therefore also contributes to a lower and/or more contained industrial hygiene problem associated with the recovery of tin and/or lead as a byproduct from the production of copper or other non-ferrous metals.

In an embodiment, the liquid molten metal feed composition which is pre-treated in the process according to the present disclosure is available at a temperature of at least 510° C., preferably at least 520° C., more preferably at least 550° C., even more preferably at least 575° C., preferably at least 600° C., more preferably at least 650° C., even more preferably at least 700° C., preferably at least 750° C., more preferably at least 775° C., even more preferably at least 800° C., yet more preferably at least 830° C. We have found that a higher feed temperature contributes to a more fluid feed stream in the upstream process where the feed stream is prepared. We have also found, at a higher temperature, that the intermetallic compounds forming between copper and tin, and which thus shall need to be removed to a certain extent as part of the present disclosure, that these intermetallic compounds are then prone to capture less tin for the same amount of copper. A higher temperature thus contributes to a more efficient removal of copper contamination, because the removed intermetallic compounds are then entraining less of the valuable tin away from the molten metal composition which is continuing its path towards the prime products. We have further found that a higher feed temperature of the crude solder allows the pre-treatment steps to be more effective and efficient. We have for instance found that a higher feed temperature provides more room for cooling, and that a wider reaching cooling trajectory is more effective in the removal of the target metal compounds, i.e. these which are capable of forming intermetallic compounds downstream in the distillation, in particular in the removal of copper.

In an embodiment, the liquid molten metal feed composition which is pre-treated in the process according to the present disclosure is available at a temperature of at most 1000° C., preferably at most 980° C., more preferably at most 960° C. We have found that limiting the feed temperature to below the specified limits brings the advantage that the energy requirement of upstream process steps remains practical, sufficiently efficient and economical. Higher temperatures, above the specified limits, have not been found to bring sufficient extra benefits in order to justify the extra energy input, in whatever form this energy input occurs, including chemical energy.

In an embodiment, the liquid molten metal feed composition which is pre-treated in the process according to the present disclosure is cooled down to a temperature of at most 820° C., preferably at most 800° C., more preferably at most 750° C., even more preferably at most 700° C., yet more preferably at most 650° C., preferably at most 600° C., even more preferably at most 550° C., preferably at most 525° C., more preferably at most 500° C., even more preferably at most 450° C., preferably at most 400° C., more preferably at most 370° C., even more preferably at most 360° C., preferably at most 350° C., more preferably at most 345° C., even more preferably at most 330° C., preferably at most 320° C., more preferably at most 310° C. to produce a bath containing a first supernatant dross which by gravity becomes floating upon a first liquid molten metal phase. We have found that the cooling of the solder removes at least a part of several of the less desired metals, in particular of copper but also of nickel, iron, zinc and aluminium, and of chromium, manganese, vanadium, titanium and tungsten, if any of these is present. We have further found that when the cooling trajectory is wider and/or reaches further down in temperature, that more of these metals come out of solution and end up in the supernatant dross. The wider the cooling trajectory is made, the more prone the cooling step becomes for being split into different successive cooling steps, preferably combined with intermediate dross removal. This brings the advantage that overall less dross may need to be removed for removing the same amount of undesired metals, and that the total amount of dross contains less of the target metals of the overall process, which are primarily lead and/or tin, but include also the various precious metals that may be present in the solder and under particular circumstances also the antimony (Sb) which may be present. We have also found that the cooler the crude solder, the higher its density, which is beneficial for the separation by gravity of the dross, because the dross comes more readily floating on top of the denser liquid metal phase.

In an embodiment, the liquid molten metal feed composition which is pre-treated in the process according to the present disclosure is cooled down to a temperature of at least 230° C., preferably at least 232° C., more preferably at least 240° C., even more preferably at least 250° C., more preferably at least 270° C., even more preferably at least 280° C., preferably at least 290° C., more preferably at least 300° C., even more preferably at least 310° C., preferably at least 320° C., more preferably at least 325° C., even more preferably at least 328° C. We have found, thanks to this lower limit of the cooling step, that there is less tin consumed in binding the same amount of copper that needs to be removed. Without wanting to be bound to this theory, the applicants believe that this is due to the formation of $Cu_6Sn_5$ becoming more favoured and the formation of $Cu_3Sn$ becoming less favoured at the lower temperatures. The lower limit of the cooling step therefore reduces the amount of valuable tin that needs to be removed together with the same amount of copper in the dross. Even if the dross is optionally recycled upstream in the process, this feature represents an efficiency improvement because less tin needs to be recycled in that process for the same amount of copper that is removed by the cooling step of the process in accordance with the present disclosure.

In the cooling step, we have further found that it is preferable to respect the minimum temperature as specified, because this assures that the metal remains liquid and that its viscosity remains sufficiently low in order to allow for the solids being formed, by the cooling and/or by the chemical reactions that are triggered by the addition of chemical compounds, to be able to raise to the surface and to be removed from the underlying liquid metal phase by skimming.

The prime purpose of adding the prescribed compound in step c) of the process according to the present disclosure is the removal of the major portion of any zinc which may be present in the crude solder.

In an embodiment, the bottom product obtained by the process according to the present disclosure, in the distillation step by the removal of lead, comprises more than 0.60% wt of lead, preferably at least 0.65% wt of lead, more preferably at least 0.70% wt of lead, even more preferably at least 0.75% wt of lead, preferably at least 0.80% wt of lead, preferably at least 1.0% wt, more preferably at least 1.5% wt, even more preferably at least 2.0% wt, preferably at least 3.0% wt, more preferably at least 4.0% wt, even more preferably at least 5.0% wt, and yet more preferably at least 6.0% wt of lead. We believe that higher contents of Pb remaining in the Sn product of the distillation may act as an extra solvent, for instance for the amount of antimony, which may be present in the feed to the distillation step. This solvency effect may be to the benefit of the separation in the distillation step. The prime target of the vacuum distillation step as part of the process according to the present disclosure is to evaporate lead (Pb) and to produce a lead-containing overhead product which is suitable for being cleaned up further by conventional means to produce a product of high purity lead, so-called "soft-lead". We believe that leaving an amount of lead in the bottom product of the distillation step helps in achieving that goal, by providing a liquid phase which remains attractive for many of the metals other than lead, and hence reducing the desire of these metals to become volatile as well as their tendency to escape from the liquid phase and to end up in the overhead product of the distillation step. We believe that this benefit is enhanced by leaving a higher concentration of lead in the bottom product of the distillation step. We believe this benefit to be particularly important for any antimony which is present in the feed to the distillation step of the process according to the present disclosure.

We have further found that the problems of the formation of intermetallic compounds during the vacuum distillation of the metal mixture according to the present disclosure are further alleviated by leaving a more important presence of lead in the bottom product of the distillation step. We believe that the higher amount of lead has a beneficial impact on keeping the potentially harmful metals better in solution and on reducing their tendency for forming the potentially disturbing intermetallic compounds during the upstream distillation step. Without being bound by theory, we believe that this effect may be based on dilution, but we suspect that there may be additional factors playing a role in reducing the risk for formation of intermetallic compounds under the conditions occurring in the vacuum distillation step.

In an embodiment, the bottom product obtained in the distillation step by the removal of lead comprises at most 10.0% wt of lead, preferably at most 9.0% of lead, more preferably at most 8.0%, even more preferably at most 7.0% wt, preferably at most 6.5% wt, more preferably at most 6.0% wt, even more preferably at most 5.0% and yet more preferably at most 4.0% wt of lead. We have found that not exceeding this prescribed level of lead in the bottom product of the distillation step brings the advantage downstream of facilitating the further separation of the different metals present in the bottom product to obtain a prime tin product which meets most of the international industry standards for high quality tin grade. We have further found that controlling the lead content in between the prescribed limits provides a practical and economical balance between on the one hand the benefits obtained by the presence of lead in the liquid all through the distillation step and on the other hand the downstream task of upgrading the bottom product of the distillation into at least a high value prime tin product in combination with one or more by-products containing the other metals present in the distillation bottom product which by-products are suitable for further processing and readily upgrading them into high value by-product streams. We have further found that a limited presence of lead in the bottom product is beneficial if there are also precious metals present and these precious metals should be recovered downstream from the vacuum distillation from its bottom stream. This recovery may for instance be performed in a crystalliser, such as described in CN102534249 for removing silver from a high silver containing crude tin product, and which may thus separate a crystalline Sn-rich phase from a liquid drain in which the precious metals concentrate together with most of the lead present, but with inevitably some of the more valuable tin remaining. We have found that the limiting of the amount of lead remaining in the bottom from the vacuum distillation reduces the amount of drain in such a crystalliser and leads to a drain which is more concentrated in the desired precious metals, and hence more interesting for further processing for recovering the precious metals. A further benefit is that less of the valuable tin is lost in the drain and remains available in the stream leading to the tin prime product.

In an embodiment the metal mixture according to the present disclosure comprises at least 15% wt of tin, preferably at least 20%, more preferably at least 22%, even more preferably at least 24% wt, preferably at least 26% wt, more preferably at least 28% wt, even more preferably at least 30% wt of tin. We have found that a higher amount of tin in the solder reduces the melting point of the mixture, with the advantage that the pre-treatment of the crude solder to prepare the solder for a flawless vacuum distillation has a wider temperature range available. As stated elsewhere in this document, this brings the advantage that more of the target metals may come out of solution and end up in the dross, which may readily be removed from the molten metal phase. We have also found that the high purity tin metal that may be recovered from the metal mixture according to the present disclosure is higher in demand as compared to the high purity lead metal that may be recovered from the same metal mixture. The tin prime product derived from the metal mixture is therefore of a higher economical value than any lead containing prime product. A higher tin content thus increases the economic interest in the metal mixture according to the present disclosure as a feedstock for recovering tin metal in high purity.

In an embodiment the metal mixture according to the present disclosure preferably comprises at least 50%, more preferably at least 55%, even more preferably at least 60% wt of lead. We have found that a higher amount of lead in the liquid metal mixture improves the separation of the dross from the liquid metal phase. With the higher concentration of lead in the liquid metal, the dross which typically has a lower density comes faster and more readily floating on top of the liquid metal phase and forms a clearer separate dross phase which may be removed with less entrainment of solder, and hence of the valuable tin and lead. Under these circumstances the dross thus also contains less of the valuable metals tin and lead. More of the tin and lead remains therefore available in the pre-treated solder for upgrade into high value prime products. In case the dross is recycled to a process step upstream of the pre-treatment step of the process according to the present disclosure, the better separation reduces the amount of tin and lead that is recycled upstream and which amount needs to be processed in order to end up in the crude solder feed to the process according to the present disclosure. We have also found that a higher lead content, thereby typically representing a lower tin content of the solder, brings the advantage that the solubility of copper in the solder is reduced, which leads to a lower copper content in the ultimate tin prime product derived from the vacuum distillation bottom product, and increasing the economic value of this tin prime product and/or reducing the burden of removing the remaining traces of copper in a downstream process step, plus the rework associated with recovering any dross created in such downstream process step.

In an embodiment the metal mixture according to the present disclosure comprises at most 80% wt of lead, preferably at most 75%, more preferably at most 70%, even more preferably at most 65%, preferably at most 60% wt of lead. We have found that an excessive amount of lead in the liquid metal mixture does not further enhance the advantages associated with a higher amount of lead in the mixture according to the present disclosure. We have further found that an excessive amount of lead dilutes the more valuable tin in the metal mixture, whereby the interest in this metal mixture as feed for recovery of high purity tin is reduced.

In an embodiment the metal mixture according to the present disclosure comprises at least 91% wt of tin and lead together, preferably at least 92%, more preferably at least 93%, even more preferably at least 94%, yet more preferably at least 95%, preferably at least 96%, more preferably at least 96.5%, even more preferably at least 97%, yet more preferably at least 97.5%, preferably at least 98%, more preferably at least 98.5%, even more preferably at least 98.7% wt of tin and lead together. The metal mixture according to the present disclosure is of interest as a feed stream for the recovery of high purity tin and lead, with the vacuum distillation step of the process according to the present disclosure as an important process element. A higher content of tin and lead together therefore increases the amount of prime products which may be recovered from the metal mixture, and reduces the amount of usually lower value by-product streams which may emerge from the further purification of the distillation products into prime product streams. This reduces the burden needed for removing these non-prime products down to a level which is imposed by the prime product specifications, and which desirably should meet as high as possible the international trade standards which are in practice. This burden comprises chemicals and energy consumption, but also manpower and equipment investment costs. The higher content of tin and lead together thus increases the economic interest in the metal mixture according to the present disclosure as a feedstock for recovering tin metal in high purity, as well as lead metal in economically acceptable forms.

In an embodiment the metal mixture according to the present disclosure comprises at least 2 ppm wt of copper, more preferably at least 3 ppm, even more preferably at least 4 ppm, yet more preferably at least 5 ppm wt of copper, preferably at least 6 ppm, more preferably at least 7 ppm, even more preferably at least 8 ppm, yet more preferably at least 9 ppm wt of copper, preferably at least 10 ppm, more preferably at least 12 ppm, even more preferably at least 14 ppm, yet more preferably at least 15 ppm wt of copper, preferably at least 16 ppm, more preferably at least 18 ppm and even more preferably at least 20 ppm wt of copper. We have found that the here specified amounts of copper may be left in the metal mixture according to the present disclosure without destroying the usefulness of the metal mixture as feed stream for the vacuum distillation step, hence without significantly reducing or destroying the effect which is obtained by the present disclosure, i.e. increasing the risk that a vacuum distillation step performed on the metal mixture would not anymore be able to operate in continuous mode over an extended period of time without encountering problems of intermetallic compounds comprising copper which impair the distillation operations. We have found that the identified problems may be reduced to a practically and economically acceptable level when the small amounts of copper, as specified, remain present in the metal mixture according to the present disclosure when used as solder feed to the distillation step.

The higher level of allowed copper in the metal mixture, as specified above, also brings the advantage that the upstream processes from which the feed stream of the process of the present disclosure is derived enjoy an increased freedom of operation. These processes may even possibly be concerned with the pyrometallurgical recovery of copper metal. The processes which produce a crude solder as by-product according to the feed stream for the process according to the present disclosure may recover prime metals other than tin and/or lead from a much wider variety of possible raw materials, primary as well as secondary, and including end-of-life metal-containing materials.

In an embodiment the metal mixture according to the present disclosure comprises at most 4500 ppm wt of copper, preferably at most 4000 ppm, more preferably at most 3500 ppm, even more preferably at most 3000 ppm, yet more preferably at most 2500 ppm, preferably at most 2000 ppm, more preferably at most 1500 ppm, even more preferably at most 1250 ppm, yet more preferably at most 1000 ppm, preferably at most 800 ppm, more preferably at most 600 ppm, even more preferably at most 400 ppm, yet more preferably at most 200 ppm, preferably at most 150 ppm, more preferably at most 100 ppm, even more preferably at most 75 ppm of copper. We have found that the lower the concentration of copper in the metal mixture according to the present disclosure, the lower the risk for the formation of intermetallic compounds when the metal mixture is subjected to vacuum distillation for removing at least part of the lead in the mixture by evaporation. We have further found that the lower the copper presence in the metal mixture according to the present disclosure, the lower the concentration of copper in the product streams from the downstream vacuum distillation. This reduces the burden in the further removal of copper from these streams on their path towards becoming prime products, in particular in terms of chemicals consumption and in terms of amounts of by-products formed, which preferably are recycled upstream of the process in accordance of the present disclosure, and hence also in terms of reducing the potentially damaging effects of these chemicals in this recycle operation, such as by attacking the refractory material in a pyrometallurgical step.

In an embodiment the metal mixture according to the present disclosure comprises at most 0.10% wt of zinc (Zn), preferably at most 0.010%, more preferably at most 0.0050%, even more preferably at most 0.0010%, preferably at most 0.0005%, more preferably at most 0.0001% wt of zinc. We have found that a vacuum distillation performed on the metal mixture according to the present disclosure may be particularly sensitive to the presence of zinc. Zinc is in the first place capable of forming intermetallic compounds, and hence contributes to the problem addressed by the present disclosure. Zinc is also a rather volatile metal and any zinc present may also at least partially become part of the vapour phase inside the distillation equipment. The heating in the distillation equipment is very often provided electrically, by sending an electric current through heating electrodes inside the distillation equipment. We have found that a control of the presence of zinc within the prescribed limits reduces the risk for electric arcs occurring between two points of these heating electrodes which may be located close to each other and between which there is a voltage difference. Such electric arcs represent a short in the electrical circuit of the heating installation, and are often a cause of immediate equipment shutdown. In case of absence or malfunction of fuses, they may cause damage to the transformer and AC/DC converter in the electrical system. The arcs are damaging and possibly destroying the electrodes, and may in addition also burn through the furnace wall, in particular when drawn between an electrode and the furnace wall.

In an embodiment the metal mixture according to the present disclosure comprises at least 0.0001% wt of zinc (Zn), preferably at least 0.0005%, more preferably at least 0.0010%, even more preferably at least 0.0050%, preferably at least 0.010%, more preferably at least 0.050% wt of zinc. We have found that it is not necessary to remove zinc down to excessively low levels in order to sufficiently alleviate the problems which zinc may cause during the vacuum distillation of the metal mixture according to the present disclosure. We have found that small amounts of zinc, as specified, may therefore be left in the metal mixture as feed for a vacuum distillation. We have found that with the specified limits, the desired low levels of zinc in the prime end-products may readily be reached.

In an embodiment the metal mixture according to the present disclosure comprises at most 0.10% wt of nickel (Ni), preferably at most 0.050%, more preferably at most 0.010%, preferably at most 0.0050%, more preferably at most 0.0010% wt of nickel (Ni). Nickel is a metal which is present in many raw materials available for the recovery of non-ferrous metals, in particular in secondary raw materials, and especially in end-of-life materials. It is thus important in the recovery of non-ferrous metals that the process is capable of coping with the presence of nickel. Furthermore, the pyrometallurgical processes for recovering non-ferrous metals often consume significant amounts of iron as a process chemical. It is advantageous to be able to use secondary iron-containing materials for this purpose. These materials may besides high amounts of iron also contain minor amounts of nickel. It is advantageous to be able to also cope with these kinds of process chemicals. Nickel is however also a metal which may form intermetallic compounds during vacuum distillation. We have found that a control within the specified limits of the amount of nickel present in the metal mixture according to the present disclosure is able to sufficiently reduce the risk for the formation of nickel-containing intermetallic compounds during vacuum distillation of the metal mixture. We have further found that it is preferred to bring the nickel content in the solder feed to the vacuum distillation step down, rather than removing larger amounts of nickel downstream in the process. Such downstream nickel removal is typically performed together with removing arsenic (As) and/or antimony (Sb), and carry a risk for generating the very toxic gasses arsine ($AsH_3$) and/or Stibine ($SbH_3$). The nickel removal down to within the specified limits therefore also reduces the downstream risk for the generation of toxic gasses, and is thus also a safety and industrial hygiene measure.

In an embodiment the metal mixture according to the present disclosure comprises at least 0.0005% wt of nickel (Ni), preferably at least 0.0010%, more preferably at least 0.0050%, preferably at least 0.010%, more preferably at least 0.050% wt of nickel (Ni). We have found that it is not essential to remove nickel down to very low levels, such as below the detection limit of 1 ppm wt. We have found that a control within the specified limits of the amount of nickel present in the metal mixture according to the present disclosure is able to sufficiently reduce the risk for the formation of nickel-containing intermetallic compounds during vacuum distillation of the metal mixture, as well as avoiding an increased safety and industrial hygiene risk downstream associated with possible arsine and/or stibine gas generation, while avoiding unnecessary efforts in the clean-up of the metal mixture in its preparation as feed for a vacuum distillation.

In an embodiment the metal mixture according to the present disclosure comprises at most 10% wt antimony (Sb), preferably at most 8%, more preferably at most 6%, preferably less than 6%, even more preferably at most 5.5%, preferably at most 5.0%, more preferably at most 4.5%, even more preferably at most 4.0%, yet more preferably at most 3.5%, even more preferably at most 3.0%, more preferably at most 2.5%, even more preferably at most 2.0%, preferably at most 1.5%, more preferably at most 1.1% wt of antimony (Sb). We have found that antimony may be allowed in the metal mixture according to the present disclosure, within specific limits, without creating problems when the metal mixture is used as feed for vacuum distillation. We have found that it is important to keep the amount of antimony below the specified upper limit because antimony may also at least partially evaporate under the distillation conditions. If the level of antimony is higher, the amount of antimony leaving the distillation step with the high lead containing overhead product may become significant. In order to obtain the higher purity prime lead product complying with the desired industry standards, this amount of antimony needs to be removed from this lead stream in the conventional clean-up steps downstream of the distillation step. An amount of antimony above the specified limit increases the burden of these downstream clean-up steps and increases the amount of by-product streams containing the antimony. Because these byproduct streams may also contain significant amounts of lead, this lead in the by-products is not ending up in the prime lead product and at least reduces the effectiveness of the overall operation. Excessive amounts of antimony also tend to increase the melting temperature of the tin-enriched liquid in the distillation equipment and downstream. This would necessitate operating at even higher temperatures, which increases the equipment wear.

In an embodiment the metal mixture according to the present disclosure comprises more than 0.42% wt of antimony (Sb), preferably at least 0.43%, more preferably at least 0.45%, even more preferably at least 0.47%, preferably at least 0.50%, more preferably at least 0.55%, even more preferably at least 0.60%, yet more preferably at least 0.65%, preferably at least 0.75%, more preferably at least 1.0%, even more preferably at least 1.5%, preferably at least 2.0%, more preferably at least 2.5% wt of antimony (Sb). We have found that the metal mixture according to the present disclosure may contain measurable, and even significant, amounts of antimony, within the specified limits, without this presence of antimony bringing significant impairment to the downstream vacuum distillation step to which the metal mixture may be subjected. We have found that this provides extra freedom of operation for the upstream processes from which the feed stream for the process according to the present disclosure is derived. Thanks to this allowance of an amount of antimony in the crude solder which they produce as an intermediate stream and as feed for the process according to the present disclosure, these upstream processes are capable of accepting an amount of raw materials in which antimony is present. Antimony may be present in a variety of primary and secondary feedstocks for non-ferrous metals, as well as in many end-of-life materials. Antimony may for instance be present in lead which was used since Roman times for plumbing. These materials may now become available as demolition materials, often in combination with copper for tubing and other purposes, and with tin and lead for the solder connections. Allowing an amount of antimony in the metal mixture according to the present disclosure, and hence also in the crude solder which is the feed stream to the process according to the present disclosure, provides the upstream processes to accept such mixed end-of-life materials. We have found that significant concentrations of antimony are allowed in the mixed metal according to the present disclosure without this creating significant difficulties for the process according to the present disclosure, as well as for the downstream processes which are further upgrading the overhead and the bottom streams which are generated by the vacuum distillation.

In an embodiment the metal mixture according to the present disclosure comprises at most 0.10% wt of iron (Fe), preferably at most 0.070%, more preferably at most 0.050%, even more preferably at most 0.010%, preferably at most 0.0050%, more preferably at most 0.003% wt, even more preferably at most 0.0030% wt of iron. Iron is a metal which is present in many raw materials available for the recovery of non-ferrous metals, in particular in secondary raw materials, and especially in end-of-life materials. Furthermore, the pyrometallurgical processes for recovering non-ferrous metals often consume significant amounts of iron as a process chemical. Iron is a metal which may form intermetallic compounds during vacuum distillation. We have found that a control within the specified limits of the amount of iron present in the metal mixture according to the present disclosure is able to sufficiently reduce the risk for the formation of iron-containing intermetallic compounds during vacuum distillation of the metal mixture.

In an embodiment the metal mixture according to the present disclosure comprises at least 0.0001% wt of iron (Fe), preferably at least 0.0002%, more preferably at least 0.0003%, even more preferably at least 0.0005%, preferably at least 0.0010%, more preferably at least 0.0015%, even more preferably at least 0.0020% wt of iron. We have found that it is not essential to remove iron down to very low levels, such as below the detection limit of 1 ppm wt. We have found that a control within the specified limits of the amount of iron present in the metal mixture according to the present disclosure is able to sufficiently reduce the risk for the formation of iron-containing intermetallic compounds during vacuum distillation of the metal mixture, while avoiding unnecessary efforts in the clean-up of the metal mixture in its preparation as feed for a vacuum distillation.

In an embodiment the metal mixture according to the present disclosure comprises at most 0.10% wt of aluminium (Al), preferably at most 0.050%, more preferably at most 0.010%, even more preferably at most 0.0050%, yet more preferably at most 0.0010%, preferably at most 0.0005%, more preferably at most 0.0001% wt of aluminium. Aluminium is a metal which is present in many raw materials available for the recovery of non-ferrous metals, in particular in secondary raw materials, and especially in end-of-life materials, such as waste beverage cans. Furthermore, the pyrometallurgical processes for recovering non-ferrous metals may use aluminium as a process chemical, such as aluminium granulate, for the removal of copper from solder-type liquid metal streams. Aluminium is a metal which may form intermetallic compounds during vacuum distillation. We have found that a control within the specified limits of the amount of aluminium present in the metal mixture according to the present disclosure is able to sufficiently reduce the risk for the formation of aluminium-containing intermetallic compounds during vacuum distillation of the metal mixture.

In an embodiment the metal mixture according to the present disclosure comprises at least 0.0001% wt of aluminium (Al), preferably at least 0.0002%, more preferably at least 0.0003%, even more preferably at least 0.0005%, preferably at least 0.0010%, more preferably at least 0.0015%, even more preferably at least 0.0020% wt of aluminium. We have found that it is not essential to remove aluminium down to very low levels, such as below the detection limit of 1 ppm wt. We have found that a control within the specified limits of the amount of aluminium present in the metal mixture according to the present disclosure is able to sufficiently reduce the risk for the formation of aluminium-containing intermetallic compounds during vacuum distillation of the metal mixture, while avoiding unnecessary efforts in the clean-up of the metal mixture in its preparation as feed for a vacuum distillation.

In an embodiment the metal mixture according to the present disclosure comprises at most 0.10% wt of sulphur (S), preferably at most 0.070%, more preferably at most 0.050%, even more preferably at most 0.010%, preferably at most 0.0050%, more preferably at most 0.0030% wt of sulphur. We have found that the presence of sulphur in the metal mixture according to the present disclosure may cause odor problems, and may pose a problem of industrial hygiene, even if the sulphur containing metal and/or slag and/or dross has cooled and solidified. These problems may present themselves during the operations and during storage, but may even be more important during maintenance interventions. We therefore prefer to bring the levels of sulphur in the metal mixture according to the present disclosure down to within the specified upper limits.

In an embodiment the metal mixture according to the present disclosure preferably comprises at least 0.0002% wt of sulphur (S), more preferably at least 0.0003%, even more preferably at least 0.0005%, preferably at least 0.0010%, more preferably at least 0.0015%, even more preferably at least 0.0020% wt of sulphur. We have found that it is not required to bring the levels of sulphur down to very low levels, such as the detection limit of 1 ppm wt, in order to achieve the result which is targeted with the control of the sulphur content. On the contrary the presence of sulphur in the metal mixture brings a technical benefit.

We have found that sulphur quite readily binds with copper to form a copper sulphide (such as CuS), and that the copper sulphide readily separates by gravity from the liquid metal mixture containing the two main components in the process, i.e. tin and lead. For that purpose, the presence of S in the process according to the present disclosure is preferred, and so is the presence of sulphur in the metal mixture according to the present disclosure. We have found that maintaining a small amount of sulphur in the metal mixture according to the present disclosure contributes in a further reduction of the small amounts of copper that remain in the metal mixture, by binding the Cu into sulphide and moving into further drosses that may be formed in further clean-up steps downstream in the overall process. The S is preferably introduced into the process or the product in a form which is possibly and readily convertible into a part of copper sulphide. We have found that sulphur containing chemical compounds, such as pyrite (FeS) may also be suitable, but we prefer to use elemental sulphur because the use thereof avoids the introduction of one or more extra chemical elements. Hence sulphur, and in particular elemental sulphur, is for the inventors a very suitable process chemical in the removal of some of the undesired metals, in particular of copper.

In an embodiment the metal mixture according to the present disclosure comprises at least 10 ppm wt of silver (Ag), preferably at least 50 ppm, more preferably at least 100 ppm, even more preferably at least 125 ppm and yet more preferably at least 150 ppm wt of silver. We have found that silver may be allowed in amounts in the process streams of the present disclosure—which are for such a precious metal significant—without impairing the vacuum distillation step, because silver was not found to be readily forming intermetallic compounds during the vacuum distillation step and to be impairing the operations. This tolerance for silver allows for the upstream processes, which produce the crude solder which is the suitable feed stream for the process according to the present disclosure, and which is at the origin of the metal mixture according to the present disclosure, to accept raw materials which contain silver. In addition the silver may be present in the raw materials in very low quantities, but becomes already somewhat concentrated in the crude solder produced upstream, even more concentrated in the mixed metal according to the present disclosure, and may become even more concentrated in the bottom product of the vacuum distillation step of the process according to the present disclosure. The sequence of pyrometallurgical process steps thus acts as a sequence of concentration steps for the precious and valuable metal which is silver, hence acts as an interesting upfront part of a silver metal recovery process. The recovery of silver from the bottom stream of the distillation of the metal mixture according to the present disclosure should therefore be much easier as compared to attempting its recovery from any of the intermediate streams upstream, and most likely also for the majority of the raw materials containing silver which are used as the starting materials for the upstream processes generating the crude solder which forms the feed for the process according to the present disclosure.

In an embodiment the metal mixture according to the present disclosure comprises at most 2000 ppm wt of silver (Ag), preferably at most 1800 ppm, more preferably at most 1700 ppm, even more preferably at most 1600 ppm, yet more preferably at most 1500 ppm, preferably at most 1400 ppm, more preferably at most 1350 ppm, preferably at most 1300 ppm, more preferably at most 1200 ppm, even more preferably at most 1100 ppm, preferably at most 1000 ppm, more preferably at most 900 ppm wt of silver. We have found that levels of silver in excess of the specified concentration become less beneficial and may even become disadvantageous. At the higher levels of silver in the feed to the vacuum distillation, a part of the silver may actually evaporate and become part of the vapour phase in the distillation step. As a result, some of the highly valuable silver may not find its way into the bottom product of the distillation step, from which it may be recovered in a practical and economical way into a suitable by-product by the downstream processes which are targeted to produce the high purity tin prime product stream.

In an embodiment the metal mixture according to the present disclosure comprises at least 10 ppm wt of bismuth (Bi), preferably at least 50 ppm, more preferably at least 100 ppm, even more preferably at least 150 ppm and yet more preferably at least 200 ppm wt of bismuth, and optionally at most 2000 ppm wt of bismuth, preferably at most 1800 ppm, more preferably at most 1500 ppm, even more preferably at most 1300 ppm, yet more preferably at most 1100 ppm, preferably at most 1000 ppm, more preferably at most 950 ppm wt of bismuth. We have found that bismuth may be relatively volatile under the conditions of the vacuum distillation step. Some of the bismuth may therefore find its way into the overhead stream of the distillation step, from which it may then need to be removed in order to obtain a lead prime product that complies with the desired product specifications. This downstream contaminant removal consumes chemicals and creates a by-product stream which contains also some valuable lead. Even if successfully recycled, these by-product streams represent a process inefficiency which is advantageously reduced.

In an embodiment the metal mixture according to the present disclosure comprises at least 10 ppm wt of arsenic (As), preferably at least 100 ppm, more preferably at least 200 ppm, even more preferably at least 300 ppm and yet more preferably at least 350 ppm wt of arsenic. This feature brings the advantage that feedstock materials that contain some arsenic may be accepted by the upstream process steps from which the solder feed for the process according to the present disclosure is derived. We have found that the overall process, including the process according to the present disclosure but also including any downstream steps for further clean-up or upstream steps to which downstream originating by-product streams may be recycled, is able to cope with the amounts of arsenic as specified. In addition, the inventors have found that some alloys of commercial interest readily accept As to certain levels without any significant problems, and that selected species of such alloys even welcome the presence of As. The metal mixture as well as the process according to the present disclosure is therefore prepared to accept the presence of As in its process streams, albeit within the specified limits.

In an embodiment the metal mixture according to the present disclosure comprises at most 2000 ppm wt of arsenic, preferably at most 1900 ppm, more preferably at most 1800 ppm, even more preferably at most 1700 ppm, yet more preferably at most 1600 ppm, preferably at most 1500 ppm, more preferably at most 1400 ppm wt of arsenic. We prefer to keep the amounts of arsenic within limits. This reduces the burden of removing arsenic downstream from any of the product streams from the vacuum distillation step. These removal steps use chemicals and generate by-product streams which inevitably contain also some amounts of valuable metals such as lead and/or tin. Even if successfully recycled, these by-product streams represent an overall process inefficiency, and it is advantageous to reduce them. Recycling may also bring problems caused by the chemicals in these by-product streams, such as a corrosive effect of sodium hydroxide on refractory materials used in the equipment and in contact with the hot liquid streams.

In an embodiment the metal mixture according to the present disclosure comprises at least 10 ppm wt of indium (In), preferably at least 50 ppm, more preferably at least 100 ppm wt of indium. We have found that the presence of indium may be acceptable within realistic boundaries. This allows the upstream process steps to accept raw materials which contain indium, and which may be unacceptable in other processes for the recovery of non-ferrous metals from raw materials containing a variety of different metals.

In an embodiment the metal mixture according to the present disclosure comprises at most 1000 ppm wt of indium, preferably at most 800 ppm, more preferably at most 700 ppm, even more preferably at most 600 ppm, yet more preferably at most 500 ppm, preferably at most 400 ppm, more preferably at most 300 ppm wt of indium. We have found that indium in significant quantities, in presence of arsenic, may form particularly stable intermetallic compounds. These compounds are characterised by a relatively low density and thus come readily floating on top of the liquid metal phase, in particular when the latter is containing lead. If this occurs in a vacuum distillation step, the intermetallic compounds may actually impair the evaporation of lead from the liquid, and thus significantly reduce the performance of the vacuum distillation. We therefore prefer to limit the concentration of indium in the metal mixture in accordance with the present disclosure to within the specified limits.

In an embodiment, the process according to the present disclosure comprises the step of removing the first supernatant dross from the bath before step c). We prefer to remove the dross from each pre-treatment step before starting the subsequent pre-treatment step. We have found that this brings the advantage that the overall amount of dross is smaller when compared with the alternative of letting the dross from different steps combine and removing all the dross together at the end of the pre-treatment steps. A dross contains also some tin and/or lead, and these amounts of valuable metals are thus disadvantageously removed from the metal stream which is fed to the distillation step. These amounts of valuable metals also increase the burden of reworking the dross for recovering the metal values therein, including the entrained tin and/or lead, but also including the other metals removed from the liquid metal stream by the pre-treatment.

In an embodiment of the process according to the present disclosure, the process for obtaining the feed composition comprises a metal smelting step and wherein at least one of the removed drosses is recycled to the smelting step, preferably all supernatant drosses that are formed and separated off being recycled to the smelting step. We have found that an upstream smelting step, such as a copper smelter, is not only a suitable non-ferrous metal recovery step for generating a crude solder stream as a by-product which is suitable for being subjected to the process according the present disclosure, and for generating by the pre-treatment step the metal mixture according to the present disclosure, but it is also a highly suitable point for recycling at least one of the drosses produced in the pre-treatment steps of the process according to the present disclosure. We prefer to recycle the first supernatant dross which is generated by the cooling in step b), as well as the second supernatant dross which is removed in step d), following the chemical reaction occurring in step c).

In step c), an alkali metal and/or an earth alkali metal may be added as such, such as adding sodium metal. In such case, we prefer to also add some water in order to react the sodium to its hydroxide and/or oxide, compounds which more readily bind with zinc. We prefer however to add the alkali metal and/or earth alkali metal in a chemically bound form, more preferably as a solid, because we have found that a bound form is better performing, and because the solid typically has a lower density than the pure metallic form and hence any excess remains floating on top of the liquid metal and may be removed together with the dross. The bound form may for instance be an oxide, but preferably is a hydroxide. We have found that calcium hydroxide (Ca(OH)$_2$) and potassium hydroxide (KOH) are suitable, but we prefer to use sodium hydroxide (NaOH), preferably in its solid form, because it is more efficient on a weight basis for binding a given amount of zinc, and also the most readily available form of suitable compounds. We have further found that the addition of the prescribed compound assists in a better phase separation between the solid supernatant dross and the underlying liquid metal phase. A better phase separation contributes to a cleaner dross containing less of the prime metals lead and tin, and thus to a more effective and useful recovery of these valuable metals, at the same time also at a higher process efficiency.

In an embodiment of the process according to the present disclosure, in step c) the alkali metal and/or the earth alkali metal is added in a chemically bound form, preferably as a solid. We have found that the addition of a pure metal form may be suitable, but we prefer to use a chemically bound form. The chemically bound form offers the alkali metal and/or the earth alkali metal in a more accessible form for entering into a chemical reaction with the target metals for being removed in the pre-treatment steps. We have found that the reaction products of the chemically bound form with the target metals, such as for instance Na$_2$ZnO$_2$, more readily separate from the molten liquid stream by gravity, and may therefore more readily be removed as a cleaner stream, containing less valuable metals.

In an embodiment of the process according to the present disclosure, in step c) the alkali metal and/or the earth alkali metal is added as an oxide or a hydroxide, preferably as a hydroxide. We have found that the process is readily capable of coping with the oxygen and hydrogen which comes with the metal in its chemically bound form. We have found that this form also avoids the introduction of chemical elements which the process would have more difficulty with.

In an embodiment of the process according to the present disclosure, in step c) sodium hydroxide is added. We have found that sodium hydroxide is most suitable for this pre-treatment step. We have also found that sodium hydroxide is more readily available and at more attractive supply conditions as compared to other chemically bound forms of alkali metals and/or earth alkali metals.

In an embodiment of the process according to the present disclosure, the feed composition contains at least 0.0010% wt of zinc (Zn) and wherein, together with an oxygen source, an ignition source is provided above the bath during and after the addition of the alkali metal and/or the earth alkali metal. We have found, when zinc is present in at least the prescribed amounts, that the alkali metal and/or the earth alkali metal which is added in step c) reacts with the zinc in a reaction which generates hydrogen gas as a by-product. This is particularly valid when sodium hydroxide is added, which generates Na$_2$ZnO$_2$ and hydrogen gas. The Na$_2$ZnO$_2$ ends up in the dross, but the hydrogen gas is released from the bath. Hydrogen gas has very wide explosion limits in a mixture with air (its lower flammability limit (LFL) in air is as low as 4% volume), and the atmosphere above the bath is typically not chemically inert but consists mainly of air and is hot. The generation of hydrogen gas in step c) therefore represents an explosion hazard. The air above the bath provides an oxygen source. We prefer to also provide an ignition source above the bath during and after the addition of the alkali metal and/or the earth alkali metal, such that the hydrogen which is generated readily burns before the composition of the mixture of air and hydrogen above the bath arrives within the explosion limits.

In an embodiment of the process according to the present disclosure, the second liquid molten metal phase is comprising at least 100 ppm wt of copper and as part of the process sulphur is added to the bath formed in step c). We have found that sulphur readily reacts with the copper present and is able to further and significantly reduce the copper content of the metal mixture. The sulphur addition was found to generate a dross containing the copper, at least partially in the form of a sulphide of copper (e.g. CuS), and we have found that this dross has a low density such that it readily comes floating on top of the molten liquid solder based on lead and tin together.

Not all copper may readily bind with the sulphur, and small amounts of copper are acceptable downstream of the treatment with sulphur. We prefer to maintain a small presence of sulphur, because we have found that this is advantageous for any further clean-up of the streams produced from the metal mixture according to the present disclosure by the evaporation of lead from the mixture. Keeping a small amount of sulphur after the sulphur treatment and dross separation, provides more time for the small amounts of Cu and S to find each other and convert to copper sulphide, which may then be separated from the metal product streams as part of steps for further clean-up downstream of the vacuum distillation.

In the embodiment wherein sulphur is added to the bath formed in step c), the temperature of the bath is at most 400° C., preferably at most 375° C., and more preferably at most 350° C. We have found that this brings the advantage that the sulphur is more effective because less of the sulphur risks to be burned away before it is able to reach the liquid metal bath and react with copper.

In an embodiment of the process according to the present disclosure, the feed composition is comprising copper and the process comprises the step of adding sulphur to the product of step d) in at least the stoichiometric amount necessary to react with the amount of copper (Cu) present, preferably at least 2% above stoichiometry, more preferably at least 5% above stoichiometry, even more preferably at least 110% of stoichiometry. We have found that the sulphur reacts readily and preferably with the copper present in the crude solder, and forms a dross containing the copper in the sulphide form, such as CuS. We have found that the specified excess of sulphur above stoichiometry contributes to a successful reduction of the copper content down to the desired levels. We have found, by adding the amounts of sulphur within the limits as specified in this document, that copper levels as low as 150 ppm wt or even lower may be obtained.

In an embodiment, the sulphur is added in an amount of at most 200% of the stoichiometric amount necessary to react with the amount of copper (Cu) present, preferably at most 150%, more preferably at most 125% of stoichiometry, even more preferably at most 120%, yet more preferably at most 115% of stoichiometry. We have found that the amounts of sulphur are sufficient for achieving an acceptable removal of copper present in the crude solder and for obtaining the target concentrations of copper in the metal mixture according to the present disclosure, as specified elsewhere in this document, and for obtaining a composition which is suitable as feed for a vacuum distillation step as part of the process according to the present disclosure. We have found that excessive excesses of sulphur are not necessary for a successful reduction of the copper to the desired levels. In addition, the sulphur containing dross may be recycled to an upstream pyrometallurgical process step, where the sulphur may form volatile sulphur oxides. Extra sulphur above the specified levels in the process according to the present disclosure therefore increases the clean-up burden on the offgasses from the upstream process steps to which the sulphur containing dross formed here is recycled. We therefore prefer to keep the amount of sulphur added to within the limits as specified.

In the embodiment of the process according to the present disclosure wherein an ignition source is provided above the bath, the ignition source is provided by adding elemental sulphur to the atmosphere above the bath. We have found that elemental sulphur readily ignites under the conditions existing above the bath during the pre-treatment step, and is able to assure that any hydrogen present is burned, even when the hydrogen concentration is below the lower flammability limit. We have further found that the added sulphur may participate and contribute in the reduction of the copper content by binding the copper chemically and move the copper into a dross. Preferably all the sulphur used for removing the copper is added as elemental sulphur to the atmosphere above the bath. We prefer to add the elemental sulphur as a granulate rather than as a powder. We prefer a dedusted granulate because any fine sulphur dust ignites rather too quickly and corresponds to a less efficient use of the sulphur, hence may necessitate a higher sulphur consumption for obtaining the same effect. This form of elemental sulphur is readily available from many sources at attractive supply conditions. This form of elemental sulphur is also readily distributable over a large part of the surface of the bath, and hence is very effective in burning the hydrogen away over this large part of the bath surface, and hence also effective in reducing the explosion risk caused by the generation of hydrogen. The granulate form brings the extra benefit of generating less dust, thus avoiding possible industrial hygiene issues with sulphur dust in the working environment and atmosphere, in addition to a more effective use of the sulphur because less sulphur may be blown away during the handling and thus not reach the bath over which it is supposed to be spread.

In the embodiment of the process according to the present disclosure wherein elemental sulphur is added and a third dross is formed which contains copper, the process further comprises the removal of the third dross from the bath. We prefer to remove this copper-containing dross separate from the first and the second dross, which brings the advantage of limiting the total amount of dross that is removed. We also prefer to recycle this third dross to an upstream smelting step, if present, in particular to an upstream copper smelting step, as the ideal location for recovery of the copper and of the tin and/or lead which almost unavoidably is removed as part of the third dross from the molten metal bath in the process according to the present disclosure.

In the embodiment of the process according to the present disclosure wherein a third dross was removed, after the removal of the third dross an amount of alkali metal and/or earth alkali metal is added to the bath. Similar to the reasons explained above for the material that is added into step c) as a process chemical, we prefer to use chemically bound form and/or a solid form. More preferably we use an oxide or a hydroxide, even more a hydroxide, and yet more preferably sodium hydroxide. We have found that this extra NaOH readily reacts the remaining sulphur into a sodium sulphite (typically $Na_2SO_2$) and hydrogen gas as a by-product. The sodium sulphite forms another dross phase which is preferably also removed from the bath. The hydrogen releases as hydrogen gas from the bath into the atmosphere above the bath. Similar reactions occur with the alternatives of the NaOH in this step.

In the embodiment of the process according to the present disclosure wherein after the removal of a third dross and the addition of an amount of alkali metal and/or earth alkali metal to the bath, an ignition source is provided above the bath. We prefer that the ignition source is provided by adding elemental sulphur to the atmosphere above the bath. We have found that elemental sulphur readily ignites under the conditions existing above the bath during the pre-treatment step, and is able to assure that any hydrogen present is burned, even when the hydrogen concentration is below the lower flammability limit. We prefer to add the elemental sulphur as a granulate rather than as a powder, with the same additional remarks as made above with respect to a preferred low dust content. This form of elemental sulphur is readily available from many sources at attractive supply conditions. This form of elemental sulphur is also readily distributable over a large part of the surface of the bath, and hence is very effective in burning the hydrogen away over this large part of the bath surface, and hence also effective in reducing the explosion risk caused by the generation of hydrogen. The granulate form brings the extra benefit of generating less dust, thus avoiding possible industrial hygiene issues with sulphur dust in the working environment and atmosphere, in addition to a more effective use of the sulphur because less sulphur may be blown away during the handling and thus not reach the bath over which it is supposed to be spread.

In an embodiment of the process according to the present disclosure, a source of silicon is added to the bath. We prefer to use a source of silicon dioxide, more preferably sand. We prefer to add this source of silicon to the bath before the removal of at least one of the drosses, preferably before the removal of the third dross, if present, but alternatively before the removal of the first dross or of the second dross, more preferably before the removal of any one of the drosses. We have found that this source of silicon, in particular when the added compound contains silicon dioxide, such as sand, brings the benefit of "stiffening" the dross, i.e. making the dross less fluid, increasing its viscosity, making it much more behave like a solid. This change of consistency of the dross facilitates the collection of the dross and the removal of the dross from the bath by skimming. The thus-treated dross has also become "drier", i.e. it may be collected and removed with a lower entrainment of valuable metals. This improves both the effectiveness and the efficiency of the overall process for producing prime metals. We have found that silicon dioxide is very suitable for being used for stiffening a dross. Sand is a convenient and readily and economically available source of silicon dioxide in adequate purity for achieving the result without impairing the process in any way. The silicon dioxide in the dross may readily be recycled with the dross to an upstream smelting step, where the silicon dioxide typically ends up in the slag byproduct from the smelter, and in which it may bring further benefits. By preference the sand is distributed over a large area of the bath surface, such that its stiffening effect reaches a large amount of the dross which at that moment is floating on top of the liquid metal in the bath.

We prefer to use an amount of sand that is not more than 5% wt relative to the amount of chemical compound added in step c), in preferred embodiments relative to the amount of NaOH added in step c). More preferably, we use at most 4% wt, even more preferably at most 3%, preferably at most 2%, more preferably at least 1%, even more preferably at most 0.5%, yet more preferably at most 0.1% wt of sand, relative to the total amount of chemical compound added in step c). In preference, we add the sand in several consecutive substeps.

The distillation step as part of the process according to the present disclosure may be performed under very low pressures, such as not more than 50 Pa absolute, possibly not more than 10-15 Pa, and often as low as 0.1-5 Pa, in combination with relatively high temperatures of at least 800° C., preferably at least 900° C. The vacuum distillation of the solder-type metal mixtures may be performed batchwise, and such batch vacuum distillation techniques have been disclosed in CN101696475, CN104141152, CN101570826, and in Yang et al, "Recycling of metals from waste Sn-based alloys by vacuum separation", Transactions of Nonferrous Metals Society of China, 25 (2015), 1315-1324, Elsevier Science Press. The distillation under vacuum of metals may also be performed in continuous mode, and such continuous distillation techniques have been disclosed in CN102352443, CN104651626 and CN104593614.

In an embodiment of the process according to the present disclosure, the distillation step is performed in continuous operating mode.

In an embodiment of the process according to the present disclosure, the distillation step is performed at a pressure of at most 15 Pa absolute, preferably at most 10 Pa, more preferably at most 5 Pa, even more preferably at most 1 Pa, yet more preferably at most 0.7 Pa absolute. We have found that a lower pressure is beneficial because it facilitates the separation of the more volatile metals from the less volatile metals. The further advantage is that the separation may be performed at a lower temperature as compared to when using a higher operating pressure. This brings the benefit that the operation is also energetically more efficient.

In an embodiment of the process according to the present disclosure, the distillation step is performed at a temperature of at least 800° C., preferably at least 850° C., more preferably at least 900° C., even more preferably at least 930° C. We have found that a higher temperature promotes the separation of the metals into a vapour and a residual liquid phase, for instance because the higher temperature increases the volatility of the more volatile metal or metals. The higher temperature may also increase the difference in volatilities between the metal or metals to be vaporized and the metal or metals to be kept in the liquid phase. We have further found that a higher temperature also reduces the risk that intermetallic compounds may form and/or adhere to the equipment walls, and thus possibly impair the distillation operations.

EXAMPLE

The following example shows the effect of cleaning of a crude solder when this solder is to be submitted to a vacuum distillation step. The enclosed FIGURE shows a flow diagram of the process steps and sequence that were operated in this example. The compositions reported in this example are expressed in weight units, and were the result of analyses of samples taken daily and averaging the results over a 3 month period.

For the analysis of a metal stream, a sample of liquid metal is taken, poured into a mould and allowed to cool to become solid. One surface of the solid sample is prepared by passing the sample one or preferably more times through a Herzog HAF/2 milling machine until a clean and flat surface is obtained. The clean and flat sample surface is then analysed using a spark optical emission spectroscopy (OES) apparatus Spectrolab M from the company Spectro Analytical Instruments (US), also available via the company Ametek (DE), whereby the parameters, crystals, detectors and tube may readily be selected and adapted in order to achieve the most appropriate performance for the desired accuracy and/or detection limit. The analysis offers results for a variety of metals in the sample, including copper, bismuth, lead, tin, antimony, silver, iron, zinc, indium, arsenic, nickel, cadmium and even the element sulphur, and this for most of these metals down to a detection limit of about 1 ppm wt.

For the analysis of a dross, the inventors prefer to use a properly calibrated X-ray fluorescence (XRF) technique, preferably using the PANalytical Axios XRF spectrometer of the company PANalytical B.V. (NL). This technique is also preferred over the OES mentioned above for analysing samples of metals containing significant amounts of contaminants, such as stream 4 and streams upstream thereof, in the flow diagram in the attached FIGURE. Also with this technique, the details may readily be selected and adapted in order to optimize the results in terms of accuracy and/or detection limit most fitting the purpose of the analysis.

The crude solder starting material originated from the refining of copper, lead and tin bearing materials (stream 1) in a copper smelter which produces a "black copper" intermediate containing about 85% wt of Cu. This black copper was then subjected in a copper refinery to a series of pyrometallurgical refining steps which produce on the one hand a higher purity copper prime product, and on the other hand a number of slag by-products. Smelter and copper refinery are represented as step 100 in the FIGURE. As part of the refinery operations, the crude solder is recovered as stream 2 from some of these refinery slags. The crude solder had the composition as shown in Table 1. Cleaning of this crude solder is performed in order to remove a significant amount of the contained metal impurities, which presence would otherwise risk to negatively affect the downstream vacuum distillation step. The target impurities for the cleaning steps are primarily Cu (1.6176%), Fe (44 ppm), Ni (11 ppm) and Zn (573 ppm), and the objective of the crude solder cleaning is that the solder may be smoothly processed further using vacuum distillation.

TABLE 1

| Crude solder from the Refinery | |
| --- | --- |
| Element | % wt |
| Bi | 0.0267 |
| Cu | 1.6176 |
| Fe | 0.0044 |
| Ni | 0.0011 |
| Pb | 73.5960 |
| Sb | 0.6927 |
| Sn | 24.0041 |
| Zn | 0.0573 |
| Total | 99.9999 |

The crude solder was available from the upstream refinery operations at a temperature of about 835° C. In a first cleaning operation sequence part 200, the solder was cooled down to 334° C., and this in two steps. In the first step, the crude solder was cooled to about 500° C. and a first dross was removed from the surface of the molten liquid. In the second step, the crude solder was cooled further down to 334° C. and a second dross was removed from the surface of the molten liquid. The cooling step 200 formed a total dross which contained the majority of the copper present in the crude solder, and which was removed as a by-product (stream 9). The concentrations of the metals of interest in the remaining solder intermediate (stream 3) are provided in Table 2. The copper content in the solder was decreased from 1.6176% down to 0.6000% by this sequence of cooling steps and dross removals. Also the Fe and the Zn concentrations in the solder had decreased significantly. All the drosses formed during the cooling operation were removed and recycled upstream in the process to the smelter step (shown as stream 9), so that its valuable metal content could be valorised as much as possible.

TABLE 2

| The solder after the cooling step | |
| --- | --- |
| % wt | Solder |
| Bi | 0.0288 |
| Cu | 0.6000 |
| Fe | 0.0010 |
| Ni | 0.0028 |
| Pb | 71.0685 |
| Sb | 0.8151 |
| Sn | 27.2817 |
| Zn | 0.0033 |
| Ag | 0.0783 |
| Au | 0.0020 |
| As | 0.0902 |
| Cd | 0.0031 |
| In | 0.0225 |

TABLE 2-continued

| The solder after the cooling step | |
| --- | --- |
| % wt | Solder |
| S | 0.0027 |
| Te | 0.0020 |
| Total | 100.0020 |

In a second cleaning step 300, solid sodium hydroxide (stream 13) was added to the solder intermediate of Table 2. In this treatment step, zinc was bound by the sodium hydroxide, presumably to form $Na_2ZnO_2$, and forming a separate phase which separated as a supernatant solid from the solder and which was removed as stream 10. As a result, the zinc content in the solder stream 4 was further decreased. The amount of sodium hydroxide was adjusted such that the Zn concentration in the solder decreased down to 16 ppm weight (Table 3). The dross which was formed in this step was also recycled (stream 10) to the upstream smelter step as part of box 100 in the FIGURE.

TABLE 3

| Solder after the first NaOH treatment | |
| --- | --- |
| Element | % wt |
| Bi | 0.0309 |
| Cu | 0.3550 |
| Fe | 0.0006 |
| Ni | 0.0017 |
| Pb | 72.9626 |
| Sb | 0.8635 |
| Sn | 25.6014 |
| Zn | 0.0016 |
| Ag | 0.0546 |
| As | 0.0998 |
| Cd | 0.0034 |
| In | 0.0208 |
| S | 0.0031 |
| Te | 0.0012 |
| Total | 100.0001 |

In the further cleaning step 400, downstream of step 300 which is using sodium hydroxide, an amount of elemental sulphur (stream 14), representing about 130% of stoichiometry relative to the amount of copper present in the metal phase, was added to further reduce the copper content of the solder. As elemental sulphur was used a granulated form of sulphur obtainable from the company Zaklady Chemiczne Siarkopol in Tarnobrzeg (PL). The sulphur 14 reacted primarily with copper to form copper sulphides which moved into another supernatant dross phase. The dross was removed as stream 11. After the sulphur addition in step 400, in step 500 a further amount of sodium hydroxide (stream 15) was added to chemically bind any leftover traces of sulphur to form another dross. After allowing some time for the reaction, a handful of granulated sulphur was scattered/spread over the bath surface. The sulphur ignited and burned any hydrogen which could have evolved from the liquid as a by-product from the reaction. Subsequently, a small amount of white sand was scattered/spread over the bath in order to dry/stiffen the dross. The total dross formed in step 500 was then removed from the liquid metal bath as stream 12. The thus obtained cleaned solder (stream 6, of which the composition is provided in Table 4) contained only 38 ppm Cu and was further processed with vacuum distillation in step 600. The sulphur containing dross 12 was reprocessed in the upstream refinery process 100, so that its valuable metal content could be valorised.

TABLE 4

Cleaned solder for vacuum distillation

| Element | % wt |
|---|---|
| Bi | 0.0326 |
| Cu | 0.0038 |
| Fe | 0.0004 |
| Ni | 0.0009 |
| Pb | 73.1206 |
| Sb | 0.8012 |
| Sn | 25.8694 |
| Zn | 0.0013 |
| Ag | 0.0537 |
| As | 0.0871 |
| Cd | 0.0020 |
| In | 0.0202 |
| S | 0.0053 |
| Te | 0.0010 |
| Total | 99.9995 |

The cleaned solder 6 was thus further processed using vacuum distillation, at an average temperature of 982° C. and an average absolute pressure of 0.012 mbar (1.2 Pa). The vacuum distillation step produced two product streams which were suitable for being further purified into high quality prime products according to industry standards. On the one hand we obtained as overhead stream 7 a product stream which contained mainly lead and on the other hand we obtained as the bottom product 8 a product stream which contained mainly tin. The compositions of these two distillation product streams 7 and 8 are provided in Table 5.

TABLE 5

Product streams of vacuum distillation

| Wt % | Lead stream (Overhead) | Tin stream (Bottom) |
|---|---|---|
| Bi | 0.0518 | 0.0014 |
| Cu | 0.0000 | 0.0273 |
| Fe | 0.0006 | 0.0000 |
| Ni | | 0.0022 |
| Pb | 99.5375 | 1.0055 |
| Sb | 0.2233 | 2.3664 |
| Sn | 0.1006 | 96.2129 |
| Zn | 0.0000 | 0.0001 |
| Ag | 0.0031 | 0.2153 |
| As | 0.0746 | 0.1193 |
| Cd | 0.0012 | 0.0000 |
| In | 0.0057 | 0.0481 |
| S | 0.0016 | |
| Te | 0.0000 | |
| Total | 100.0000 | 99.9998 |

The vacuum distillation was performed in continuous mode, and during a time period of about three (3) years without the observation of any blocking or clogging of the distillation equipment due to the formation of intermetallic compounds. Both product streams of the vacuum distillation step remained during the entire time period suitable for being further refined, in steps 700 and 800 respectively, to form prime products in compliance with established international industry standards.

Having now fully described this disclosure, it will be appreciated by those skilled in the art that the disclosure can be performed within a wide range of parameters within what is claimed, without departing from the scope of the disclosure, as defined by the claims.

The embodiments of the disclosure in which an exclusive property or privilege is claimed are defined as follows:

1. A process for the separation by distillation of a metal mixture containing lead (Pb) and tin (Sn), the process comprising the step of pre-treating a liquid molten metal feed composition,
   a) the feed composition containing substantial portions of tin and lead and comprising at least 0.16% wt of the total of chromium (Cr), manganese (Mn), vanadium (V), titanium (Ti), tungsten (W), copper (Cu), nickel (Ni), iron (Fe), aluminium (Al) and/or zinc (Zn),
   the feed composition having a temperature of at least 500° C.,
   the pre-treatment step comprising the steps of:
   b) cooling the feed composition down to a temperature of at most 825° C., to produce a bath containing a first supernatant dross which by gravity becomes floating upon a first liquid molten metal phase,
   c) adding a compound selected from the group consisting of an alkali metal, an earth alkali metal, a chemical compound comprising an alkali metal, a chemical compound comprising an earth alkali metal, and combinations thereof, to the first liquid molten metal phase to form a bath containing a second supernatant dross which by gravity comes floating on top of a second liquid molten metal phase, and
   d) removing the second dross from the second liquid molten metal phase,
   whereby the liquid molten metal phase which is obtained as product from the pre-treatment forms the metal mixture containing lead (Pb) and tin (Sn) and further comprising, on a weight basis
   at least 10% tin,
   at least 45% lead,
   at least 90% of tin and lead together,
   more lead than tin,
   at least 1 ppm and at most 5000 ppm of copper,
   at least 0.42% of antimony (Sb),
   at least 0.0001% wt of sulphur (S), and
   at most 0.1% of the total of chromium (Cr), manganese (Mn), vanadium (V), titanium (Ti) and tungsten (W),
   at most 0.1% of aluminium (Al),
   at most 0.1% of nickel (Ni),
   at most 0.1% of iron (Fe), and
   at most 0.1% of zinc (Zn),
   the process further comprising the step of subjecting the metal mixture to a distillation step wherein lead (Pb) is removed from the metal mixture by evaporation and a bottom product is obtained which comprises at least 0.6% wt of lead.

2. The process according to claim 1 comprising the step of removing the first supernatant dross from the bath before step c).

3. The process according to claim 2 whereby the process for obtaining the feed composition comprises a metal smelting step and wherein at least one of the removed drosses is recycled to the smelting step.

4. The process according to claim 1 whereby in step c) the metal selected from an alkali metal and an earth alkali metal is added in a chemically bound form.

5. The process according to claim 1 whereby the metal selected from the alkali metal and the earth alkali metal is added as a compound selected from an oxide and a hydroxide.

6. The process according to claim 1 whereby in step c) sodium hydroxide is added.

7. The process according to claim 1 whereby the feed composition contains at least 0.0010% wt of zinc (Zn) and whereby, together with an oxygen source, an ignition source is provided above the bath at a moment selected from during the addition and after the addition of the metal selected from the alkali metal and the earth alkali metal.

8. The process according to claim 1 whereby the second liquid molten metal phase is comprising at least 100 ppm of copper and whereby sulphur is added to the bath formed in step c).

9. The process according to claim 8 whereby the ignition source above the bath is provided by adding elemental sulphur to the atmosphere above the bath.

10. The process according to claim 1 whereby the feed composition is comprising copper and the process comprises the step of adding sulphur to the product of step d) in at least the stoichiometric amount necessary to convert the amount of copper (Cu) present into CuS.

11. The process according to claim 10 wherein after the sulphur addition a third dross is formed, the process further comprising the removal of the third dross from the bath.

12. The process according to claim 11 wherein after the removal of the third dross, an amount of sodium hydroxide is added to the bath.

13. The process according to claim 12 wherein, after the addition of the NaOH, an ignition source is provided above the bath.

14. The process according to claim 1 wherein a source of silicon is added to the bath.

15. The process according to claim 1 wherein the distillation step is performed in continuous operating mode.

16. The process according to claim 1 wherein the distillation step is performed at a pressure of at most 15 Pa absolute.

17. The process according to claim 1 wherein the distillation step is performed at a temperature of at least 800° C.

18. The process according to claim 1 whereby the process for obtaining the feed composition comprises a metal smelting step and wherein at least one of the removed drosses is recycled to the smelting step.

* * * * *